May 27, 1941.                F. R. ELLIOTT                2,243,597
                            TRACTION SPRAYER
                    Original Filed July 17, 1936      2 Sheets-Sheet 1
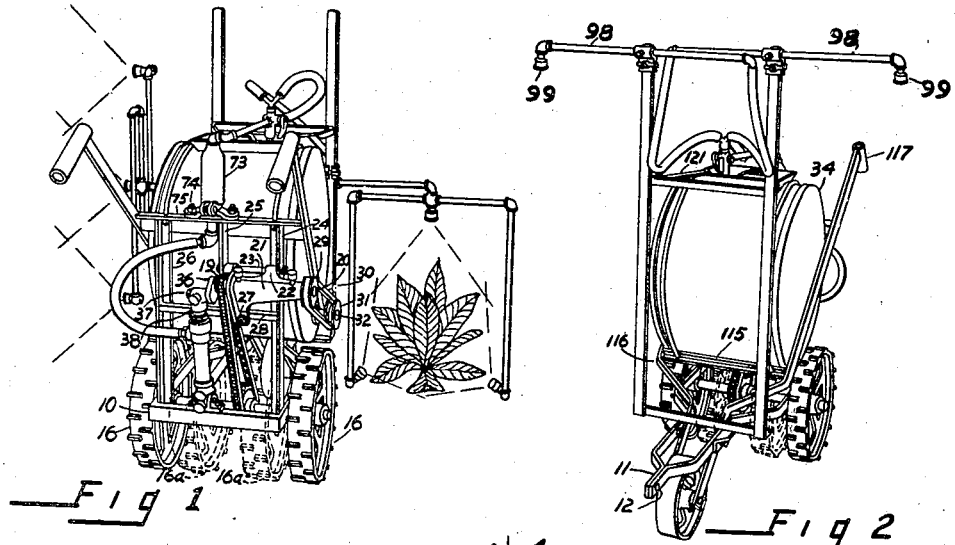
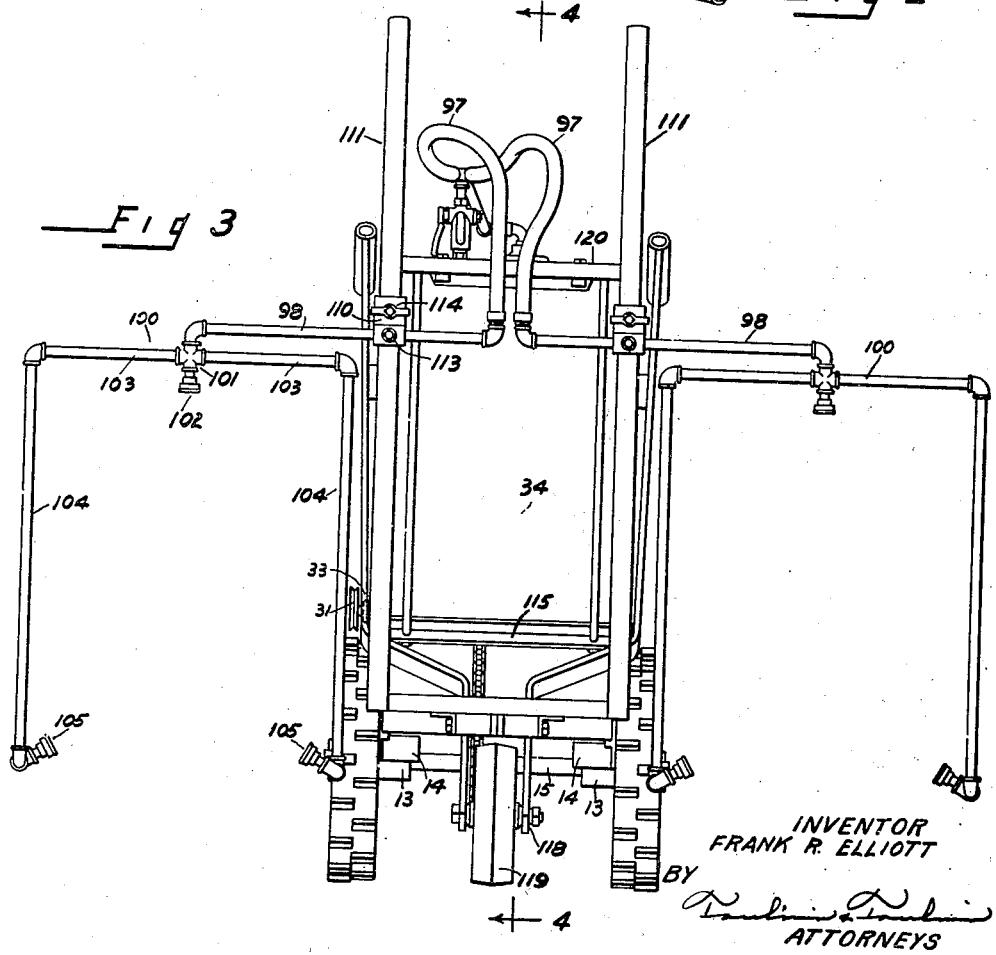
INVENTOR
FRANK R. ELLIOTT
BY
ATTORNEYS

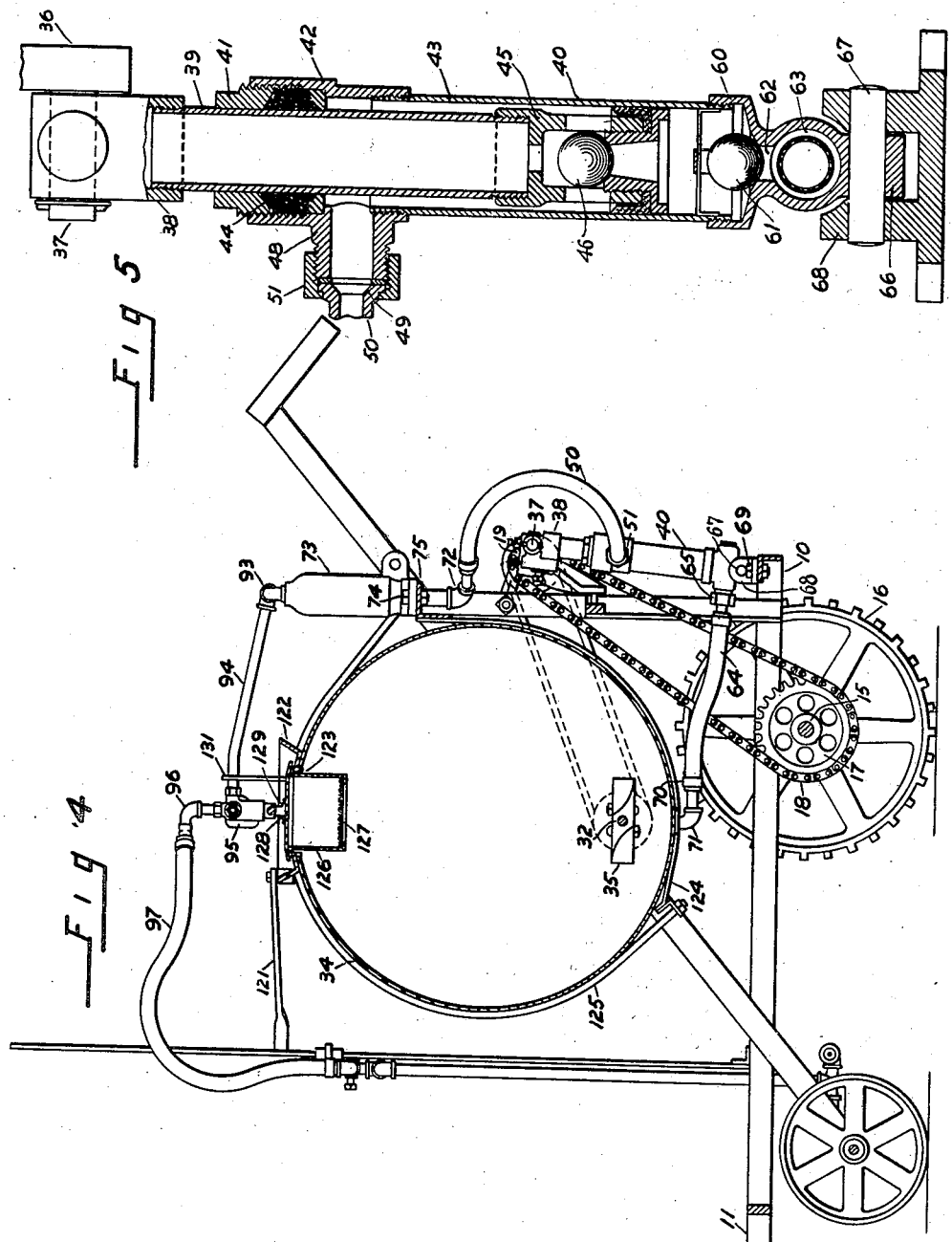

Patented May 27, 1941

2,243,597

UNITED STATES PATENT OFFICE 2,243,597

TRACTION SPRAYER

Frank R. Elliott, Ashland, Ohio, assignor to The F. E. Myers & Bro. Company, Ashland, Ohio, a corporation of Ohio Original application July 17, 1936, Serial No. 91,166. Divided and this application November 10, 1937, Serial No. 173,890

3 Claims. (Cl. 299—46)

This invention relates to spraying devices, and in particular, to traction sprayers which operate automatically as the sprayer is moved.

One object of this invention is to provide a traction sprayer having wheels for supporting the sprayer, these wheels being adapted to be mounted either upon the outside of the frame of the sprayer so as to give a wide tread, or upon the inside thereof to give a narrow tread, thereby enabling the sprayer to be used for spraying plants or other articles with either wide or narrow spaces between rows.

Another object is to provide a traction sprayer having a removable axle and wheels removably arranged thereon in such a manner that the axle may be temporarily removed from the frame in order to shift the wheels from outside to inside the frame, whereupon the axle is replaced, thereby adapting the sprayer to operate in fields having either widely-spaced or narrowly-spaced rows of plants.

This application is a division of my application Serial No. 91,166, filed July 17, 1936.

In the drawings:

Figure 1 is a rear elevation in perspective of the traction spraying device of this invention, showing one of the multiple spray nozzle arrangements in position for spraying a plant, and the other multiple spray nozzle assembly in its folded position.

Figure 2 is a front elevation in perspective of the traction sprayer shown in Figure 1, but with a single nozzle mounted on each side of the machine, at the front thereof, in place of the multiple nozzle assembly shown in Figure 1.

Figure 3 is an enlarged front elevation of the traction sprayer shown in Figure 1, showing a pair of multiple nozzle assemblies in position for spraying a double row of plants or other articles.

Figure 4 is a central vertical section through the sprayer shown in Figure 3, taken along the line 4—4 thereof.

Figure 5 is a central vertical section through the spray pump for pumping the spraying fluid from the tank to the spray nozzle.

In general, the traction sprayer of this device consists of a tank mounted upon wheels which may be placed either inside or outside the frame of the sprayer, so as to enable the sprayer to be used for spraying plants or other articles in rows with either wide or narrow separations. The wheels of the sprayer are drivingly connected to operate a pump as the sprayer is advanced, as by a horse or a tractor. The pump thus operated withdraws fluid from the tank and pumps it, by way of a cushion chamber and a combination valve, to a spray nozzle, the valve being arranged so that it may be set in one position to discharge the fluid into the spray nozzle, and in another position to cut off the discharge from the spray nozzle and by-pass it back into the tank. The combination valve is also provided with a relief device adapted to discharge the excess fluid back into the tank when the pressure in the nozzle line exceeds the setting pressure of the relief device.

Referring to the drawings in detail, Figures 1, 2 and 4 show the traction sprayer of this invention as consisting of a base frame 10 having a forwardly extended portion 11 for attachment to a horse or tractor, as by a connection made through the hole 12 therein. Mounted upon this base frame 10 are journals 13 (Figure 3), having overhanging portions 14 adapted to protect the journals 13. Mounted for rotation in the journals 13 is an axle 15 having wheels 16 on the opposite ends thereof. The wheels 16 are removably mounted upon the ends of the axle 15 in such a manner that they may be taken off and replaced inside the base frame 10 between the opposing journals 13. In Figure 1 the outer position of the wheels is shown in solid lines, designated 16, and the inner position in dotted lines, designated 16a. By this arrangement the tread of the machine is narrowed to such an extent that the sprayer may be employed in very narrow spaces between rows of plants or other articles arranged closer together.

Mounted on the axle 15 is a sprocket 17 (Figure 4) engaging a sprocket chain 18, the opposite end of which passes around a driven sprocket 19. The driven sprocket 19 (Figure 1) is mounted upon a countershaft 20 supported in a pivoted shaft hanger 21, having pivot bosses 22 arranged to move pivotally upon the pivot rod 23. The latter is secured between the frame uprights 24 and 25 rising from the base frame 10. An additional frame upright 26 rises from the opposite side of the base frame 10 from the upright 24. The free end of the shaft hanger 21 is provided with an adjusting screw 27, which passes through the shaft hanger 21 and engages the frame cross member 28 (Figure 1). Consequently, when the adjusting screw 27 is turned the free end of the shaft hanger 21 is moved in one direction or the other, thereby tightening or loosening the sprocket chain 18 by varying the distance between the axle 15 and the countershaft 20.

Mounted upon the opposite end of the countershaft 20 from the sprocket 19 is a pulley 29 having a belt 30 arranged to drive a pulley 31 upon the agitator shaft 32. The latter is journalled, as at 33, (Figure 3) in the side wall of the tank 34 and carries on its inner end an agitator 35 adapted to agitate the contents of the tank 34 as the traction sprayer advances. The agitator 35 may consist of paddle blades adapted to perform this agitating function. Mounted on the end of the countershaft 20, adjacent the sprocket 19, is a crank 36 (Figure 1), having a crank pin 37 extending outwardly therefrom and engaged by the crosshead 38 of the pump plunger 39 (Figure 5). The upper end of the pump plunger 39 of the pump, generally designated 40, passes through a gland 41 and enters a casing head 42 attached to the pump barrel 43. A packing 44 encircles the pump plunger 39 and is compressed by the gland 41 in such a manner as to prevent leakage at that point. The pump plunger 39 is provided at its lower end with a piston head 45 and a check valve 46. The fluid pumped by the piston head 45 passes into the connection 48 having the terminal 49 of the fluid pipe 50 secured thereto, as by the threaded ring 51.

To the lower end of the pump barrel 43 is secured a head 60 having a ball check valve 61 adapted to close a passageway 62 leading into a chamber 63 to which the supply pipe 64 is attached (Figure 4), as at the connection 65. The head 60 is provided at its lower end with a tongue 66, through which passes a pivot pin 67 supported by the bifurcated bracket 68 having its base portion secured to the base frame 10, as by the bolts 69. The opposite end of the supply pipe 64 is attached, as at 70, to the outlet 71 of the tank 34, whereas the opposite end of the pipe 50 is attached to the connecting pipe 72 of the air chamber 73. The latter is mounted, as by the bolts 74 (Figure 4), upon the upper frame cross member 75 secured to and extending between the vertical frame members 24, 25 and 26.

The fluid pumped by the pump 40 passes from the tank 34, through the pipe 64 and the pump 40 (Figure 4), into the pipe 50, and thence into the air chamber 73 as the wheels 16 rotate the axle 15 and cause the crank pin 37 to reciprocate by the intermediate action of the sprocket chain 18 upon the sprocket 19. The fluid pumped into the air chamber 73 leaves it through the connection 93 and passes through the pipe 94 to the control valve, generally designated 95. Beyond the control valve 95, the fluid passes into the Y-connection 96 and the pipes 97 (Figures 3 and 4) to the discharge pipes 98. The outer ends of the discharge pipes 98 may be connected either directly to the nozzle tips 99 (Figure 2) or to the multiple nozzle arrangement, generally designated 100, consisting of the four-way connection 101 having a nozzle tip 102 attached to one branch thereof and the pipes 103 attached to two of the remaining ports of the four-way connection 101. The remaining port of the connection 101 is attached to the end of the discharge pipe 98, and the outer ends of the pipes 104 terminate in the obliquely directed nozzle tips 105.

The discharge pipes 98 are supported in clamps 110 mounted upon the vertical frame uprights 111. By loosening the set screws 113 the discharge pipes 98 may be moved horizontally, and by loosening the set screws 114 the entire spray nozzle assembly may be moved vertically along the uprights 111 (Figure 3). The tank 34 is supported upon a cross member 115 extending between the obliquely directed frame members 116. The latter terminate at their upper ends in the handles 117, and intermediately are interconnected by the frame cross member 75. The lower ends of the frame members 116 are interconnected by the axle 118, upon which is mounted the wheel 119. The frame uprights 111 are additionally interconnected by the horizontal frame member 120, from which the members 121 (Figures 2 and 4) extend rearwardly to the member 122 surrounding the filling aperture 123 of the tank 34.

The tank 34 rests in a cradle formed by the straps 124 attached at their lower ends to the frame cross member 115 and at their upper ends to the frame cross member 75. The rods 125, secured at their opposite ends to these same members and passing over the top of the tank, hold the tank securely against the straps 124. Arranged within the filling aperture 123 of the tank 34 is a filling closure member 126, having a strainer 127 at the lower portion thereof and a cover 128 with a handle 129 thereon.

The operation of the traction spraying device as a whole is self evident from the operation which has been described in connection with its various parts. A horse or a tractor is attached to the front portion 11 of the base frame, and the traction sprayer is caused to advance between the rows of plants or other articles to be sprayed. The nozzles having been properly adjusted, according to the particular arrangement of plants to be sprayed, the valve 95 is turned into the position where it will pass fluid from the pipe 94 to the pipes 97 and 98. The rotation of the wheels 16 then operates the pump 40 through the intermediate action of the sprockets 17 and 19, the sprocket chain 18 and the crank pin 37 on the crank 36. The pump pumps the fluid from the tank 34, through the pipes 64 and 50, to the air chamber 73, where the pulsations of the pump are eliminated. The fluid passes onward through the pipe 94, into the valve 95, and thence through the connection 96 and flexible pipe 97, and discharge pipe 98 to the various nozzles. Meanwhile, the agitator 35 is rotated by the same action, and maintains the contents of the tank 34 in a thoroughly mixed condition, thus preventing settling of any solid ingredients which may be employed in the fluid.

In the event that the plants or other objects to be sprayed are placed in rows so close together that the normal position of the wheels 16 will not permit the sprayer to pass between the rows, the wheels 16 may be removed from their position on the outside of the base frame 10 and placed on the inside, in the manner shown in dotted lines 16a in Figure 1. This is done by removing the axle 15 from its journals 13 and sprocket 17, placing the wheels 16 within the base frame 10 and then replacing the axle 15 and tightening the various wheels and sprocket 17 thereon.

It will be understood that I desire to comprehend within my invention such modifications as come within the scope of the claims and the invention.

Having thus fully described my invention, what I claim as new and desire to secure by Letters Patent is:

1. In a traction spraying machine, a frame having a rectangular shaped base comprising laterally spaced bars, a tank for holding spray liquid, a pump and spray nozzle operatively connected to said tank, a removable axle of substantially uniform diameter mounted on said frame, aligned journals attached closely adjacent the underside of said bars for rotatably supporting said axle, traction wheels slidably received on the axle and fixed to rotate said axle, said bars being sufficiently spaced from each other to enable said wheels to be mounted unobstructively on the axle within the space between the bars, said tank being so vertically spaced above said frame that the wheels clear the tank when placed between said bars, said axle being of a length so that the wheels are mountable thereon outside said bars and adjacent the ends of said axle, and separate means drivingly connected to said axle for operating said pump to force spray fluid through said nozzle.

2. In a traction spraying machine, a frame having a rectangular shaped base comprising laterally spaced bars, a tank for holding spray liquid, a pump and spray nozzle operatively connected to said tank, a removable axle of substantially uniform diameter mounted on said frame, aligned journals attached closely adjacent the underside of said bars for rotatably supporting said axle, a pair of traction wheels slidably received on the axle and fixed to rotate said axle, said bars being sufficiently spaced from each other to enable said wheels to be mounted unobstructively on the axle within the space between the bars, said tank being so vertically spaced above said frame that the wheels clear the tank when placed between said bars, said axle comprising a length to enable the wheels to be mounted thereon outside the bars adjacent the ends of said axle, and separate means drivingly connected to said axle including a sprocket and chain mechanism for operating said pump.

3. In a traction spraying machine, a frame having a rectangular shaped base comprising laterally spaced bars, a tank for holding spray liquid, a pump and spray nozzle operatively connected to said tank, aligned journals mounted on the underside of said bars, an axle of substantially uniform diameter rotatably supported in said journals, a pair of traction wheels slidably received on said axle and fixed to rotate said axle, said bars being sufficiently spaced from each other to enable said wheels to be mounted unobstructively on the axle within the space between the bars, said tank being so vertically spaced above said frame that the wheels clear the tank when placed between said bars, said axle extending out beyond said laterally spaced bars so that the wheels can be mounted thereon outside the bars and adjacent the end of said axle, and separate means drivingly connected to said axle for operating said pump.

FRANK R. ELLIOTT.